(12) United States Patent
Prat et al.

(10) Patent No.: US 6,761,867 B1
(45) Date of Patent: Jul. 13, 2004

(54) CONCENTRATED SUSPENSION OF PRECIPITATION SILICA, PROCESSES FOR ITS PREPARATION AND USES OF THIS SUSPENSION

(75) Inventors: Evelyne Prat, Pantin (FR); Lâürent Frouin, L'Hay les Roses (FR)

(73) Assignee: Rhone-Poulenc Chimie, Courbevoie Cedex (FR)

( * ) Notice: Subject to any disclaimer, the term of this patent is extended or adjusted under 35 U.S.C. 154(b) by 142 days.

(21) Appl. No.: 08/765,901

(22) PCT Filed: Jul. 5, 1995

(86) PCT No.: PCT/FR95/00901

§ 371 (c)(1),
(2), (4) Date: Jan. 7, 1997

(87) PCT Pub. No.: WO96/01787

PCT Pub. Date: Jan. 25, 1996

(30) Foreign Application Priority Data

Jul. 7, 1994 (FR) .............................. 94 08430

(51) Int. Cl.[7] .............................. C01B 33/12
(52) U.S. Cl. ................................... 423/339
(58) Field of Search ............... 106/287.34, 287.17; 423/335, 338, 339; 516/82

(56) References Cited

U.S. PATENT DOCUMENTS 4,837,195 A * 6/1989 Cox et al. .................. 423/335
5,028,360 A * 7/1991 Ito et al. ........................ 264/12
5,403,570 A * 4/1995 Chevallier et al. .......... 423/339

FOREIGN PATENT DOCUMENTS

| EP | 0 329 509 | 8/1989 |
| EP | 0 368 722 | 5/1990 |
| EP | 0 520 862 | 12/1992 |
| WO | 90 03330 | 4/1990 |

* cited by examiner

*Primary Examiner*—Stuart Hendrickson
(74) *Attorney, Agent, or Firm*—Burns, Doane, Swecker & Mathis, L.L.P.

(57) ABSTRACT

The invention relates to an aqueous suspension of precipitated silica, characterized in that its solids content is between 10 and 40% by weight, its viscosity is lower than $4 \times 10^{-2}$ Pa.s at a shear rate of $50\ s^{-1}$ and the quantity of silica present in the supernatant obtained after centrifuging the said suspension at 7500 revolutions per minute for 30 minutes represents more than 50% of the weight of the silica present in the suspension. The particle size distribution of the agglomerates in suspension is such that their median diameter $D_{50}$ is smaller than 5 μm and the deagglomeration factor $F_D$ is greater than 3 ml.

This suspension can be employed for the production of anticorrosion coatings and for the preparation of concretes, of paper or of inorganic adhesives.

18 Claims, No Drawings

CONCENTRATED SUSPENSION OF PRECIPITATION SILICA, PROCESSES FOR ITS PREPARATION AND USES OF THIS SUSPENSION

The present invention relates to an aqueous suspension of precipitated silica.

Aqueous silica suspensions are employed in very varied fields, and especially the papermaking industry or that of concrete.

For these diverse applications it in advantageous to have suspensions which have a high solids content. However, such suspensions exhibit very high viscosities, and this results in difficulties in pumping and therefore reduces the possibilities of industrial utilization.

Moreover, these suspensions tend to settle or to gel and, as a result, they exhibit an instability which makes then difficult to transport or store. Very frequently, after transportation or after a more or less long period of storage, the formation of a gel is actually observed or the deposition of a hard layer above which there is a slurry which is fluid but low in solids. It is then often impossible to resuspend the silica or to obtain a slurry exhibiting a viscosity which is sufficiently low to make it pumpable and therefore usable industrially.

The aim of the present invention is therefore to provide aqueous silica suspensions of high solids content, exhibiting a low viscosity and a good stability in time.

Thus, more precisely, the subject of the invention is an aqueous suspension of precipitated silica, characterized in that its solids content is between 10 and 40%, its viscosity is lower than $4 \times 10^{-2}$ Pa.s at a shear rate of 50 s$^{-1}$ and the quantity of silica present in the supernatant obtained after centrifuging the said suspension at 7500 revolutions per minute for 30 minutes represents more than 50% of the weight of the silica present in the suspension.

The solids content of the said suspension is preferably between 15 and 35% by weight. The viscosity of the said suspension is advantageously lower than $2 \times 10^{-2}$ Pa.s at a shear rate of 50 s$^{-1}$.

The suspension according to the invention is very stable and its stability can be assessed by virtue of a settling test which consists in centrifuging the said suspension at 7500 rev/min for 30 minutes. The quantity of silica present in the supernatant obtained at the end of this centrifuging, measured after drying the supernatant at 160° C. until a constant weight of material is obtained, represents more than 50%, preferably more than 60% of the weight of the silica present in the suspension.

The quantity of silica present in the supernatant obtained after centrifuging advantageously represents more than 70%, in particular more than 90% of the weight of the silica present in the suspension.

Another characteristic of the suspension according to the invention relates to the particle size of the silica particles in suspension.

In fact, concentrated silica suspensions known hitherto, besides their high viscosity, have the disadvantage of comprising large-sized agglomerates in suspension, in particular making injection into a porous medium difficult.

The particle size distribution of the suspended matter can be defined by means of the median diameter $D_{50}$, which is the particle diameter such that 50% of the population of particles in suspension have a smaller diameter.

Similarly, $D_{95}$ represents the particle diameter such that 95% of the population of particles in suspension have a smaller diameter.

Another characteristic quantity of the suspensions is the deagglomeration factor $F_D$. This factor, which is proportionally higher the more the silical suspension is deagglomerated, is an indication of the fines content, that is to say the content of particles smaller than 0.1 µm in size, which are not detected by a particle size analyser.

$F_D$ is measured by introducing into a particle size analyser a known volume V of suspension which is diluted so as to obtain a silica content of 4% by weight, and is equal to the ratio (10×V in ml/(optical concentration detected by the particle size analyser).

The silica agglomerates present in the suspension according to the invention are small in size.

The particle size distribution of the agglomerates in suspension is preferably such that their median diameter $D_{50}$ is smaller than 5 µm and the deagglomeration factor $F_D$ is greater than 3 ml.

The diameter $D_{50}$ is advantageously smaller than 2 µm, the factor $F_D$ being greater than 13 ml and, furthermore, the diameter $D_{95}$ being smaller than 20 µm.

The suspension according to the invention preferably includes a filter cake originating from a precipitation reaction (referred to in what follows as "precipitation cake"), which is washed, if need be, and then crumbled.

According to an embodiment of the invention the crumbling is carried out, inter alia, by a chemical route, with the result that the suspension includes aluminium in a quantity such that the Al/SiO$_2$ weight ratio is between 1000 and 3300 ppm.

The said suspension can be prepared by various processes which are described below and which are also subjects of the present invention.

The synthesis of the silica is performed by a precipitation reaction (A) making use of an alkali metal silicate SiO$_2$/nM$_2$O, n being the molar ratio of the silicate, and an acidifying agent. Next, in a stage (B), the precipitation cake in separated from the reaction mixture and then, in a stage (C), is converted into a suspension which has the desired properties.

Any common form of silicates can be employed as silicate for the precipitation reaction, such as meta-silicates, disilicates and advantageously a silicate of an alkali metal M in which M is sodium or potassium.

In the case where sodium silicate is employed, the latter advantageously has an SiO$_2$/Na$_2$O molar ratio of between 2 and 4, more particularly between 3.0 and 3.7.

The choice of the acidifying agent and of the silicate is made in a way which is well-known per se. It may be recalled that the acidifying agent generally employed is a strong mineral acid such as sulphuric acid, phosphoric acid, nitric acid or hydrochloric acid, or an organic acid such as acetic acid, formic acid or carbonic acid.

In general it is preferred to employ sulphuric acid as acidifying agent and sodium silicate as silicate.

In a first embodiment of the invention the precipitation (A) in carried out in the following manner:

(i) an initial base stock is formed, comprising absorsportion of the total quantity of the alkali metal (M) silicate introduced into the reaction, the silicate concentration expressed as SiO$_2$ in the said base stock being lower 20 g/l, (ii) the acidifying agent is added to the said initial base stock until at least 5% of the quantity of M$_2$O present in the said initial base stock is neutralized, (iii) acidifying agent is added to the reaction mixture simultaneously with the remaining quantity of alkali metal silicate such that the ratio (quantity of silica added)/(quantity of silica present in the initial base stock) is between 10 and 100. This latter ratio is called a consolidation ratio.

It has thus been found that a very low silicate concentration, expressed as $SiO_2$, in the initial base stock and an appropriate consolidation ratio during the simultaneous addition stage constitute important conditions for endowing the products obtained with their outstanding properties.

In this embodiment the operation is preferably carried out as follows:

a base stock which includes silicate is formed first of all. The quantity of silicate present in this initial base stock advantageously represents only a proportion of the total quantity of silicate introduced into the reaction.

According to an essential characteristic of the process of preparation according to the invention, the silicate concentration in the initial base stock is lower than 20 g of $SiO_2$ per liter. This concentration is preferably not more than 11 g/l and, possibly, not more than 8 g/l.

The conditions imposed on the silicate concentration in the initial base stock partially determine the characteristics of the silicas obtained.

The initial base stock may include an electrolyte. Nevertheless, preferably, no electrolyte in employed during the process of preparation according to the invention; in particular, the initial base stock preferably does not include any electrolyte.

The term electrolyte is used here in its normally accepted sense, that in to say that it means any ionic or molecular substance which, when in solution, decomposes or dissociates to form ions or charged particles. It is possible to mention as an electrolyte a salt from the group of the alkali and alkaline-earth metal salts, especially the salt of the metal in the original silicate and of the acidifying agent, for example sodium sulphate in the case of the reaction of a sodium silicate with sulphuric acid.

The second stage, consists in adding the acidifying agent to the base stock of the composition described above.

Thus, in this second stage, the acidifying agent is added to the said initial base stock until at least 5%, preferably at least 50%, of the quantity of $M_2O$ present in the said initial base stock is neutralized.

In this second stage, the acidifying agent is preferably added to the said initial base stock until 50 to 99% of the quantity of $M_2O$ present in the said initial base stock is neutralized.

The acidifying agent may be dilute or concentrated; its normality may be between 0.4 and 36 N, for example between 0.6 and 1.5 N.

In particular, in the case where the acidifying agent is sulphuric acid, its concentration is preferably between 40 and 180 g/l, for example between 60 and 130 g/l.

Once the desired value of the quantity of neutralized $M_2O$ has been reached, a simultaneous addition (stage (iii)) of acidifying agent and of a quantity of alkali metal (M) silicate is then performed, such that the consolidation ratio, that is to say the ratio (quantity of silica added)/(quantity of silica present in the initial base stock) is between 10 and 100, preferably between 12 and 50, in particular between 13 and 40.

Throughout stage (iii), the quantity of acidifying agent which is added is preferably such that 80 to 99%, for example 85 to 97%, of the quantity of $M_2O$ added is neutralized.

The acidifying agent employed during stage (iii) may be dilute or concentrated; its normality may be between 0.4 and 36 N, for example between 0.6 and 1.5 N.

In particular, in the case where this acidifying agent is sulphuric acid, its concentration is preferably between 40 and 180 g/l, for example between 60 and 130 g/l.

In general, the alkali metal silicate added during stage (iii) exhibits a concentration, expressed as silica of between 40 and 330 g/l, for example between 60 and 250 g/l.

The actual precipitation reaction is finished when the whole remaining quantity of silicate has been added.

It is advantageous to perform a maturing of the reaction mixture, especially after the abovementioned simultaneous addition, it being possible for this maturing to last, for example, for 1 to 60 minutes, in particular for 5 to 30 minutes.

Finally, it is desirable, in a subsequent stage, after the precipitation, especially before the optional maturing, to add an additional quantity of acidifying agent to the reaction mixture. This addition is generally made until a pH value of the reaction mixture of between 3 and 6.5, preferably between 4 and 5.5, is obtained. It makes it possible especially to neutralize the whole quantity of $M_2O$ added during stage (iii).

The acidifying agent employed during this addition in generally identical with that employed during stage (iii) of the process of preparation according to the invention.

The temperature of the reaction mixture is usually between 60 and 98° C.

The addition of acidifying agent during stage (ii) is preferably done into an initial base stock whose temperature is between 60 and 96° C.

According to an alternative form of the invention the reaction in performed at a constant temperature of between 75 and 96° C. According to another alternative form of the invention the temperature at the end of reaction is higher then the temperature at the beginning of reaction: thus, the temperature at the beginning of the reaction is preferably maintained between 70 and 96° C., and the temperature is then increased during the reaction over a few minutes, preferably up to a value of between 80 and 98° C., at which value it is maintained until the end of the reaction.

At the end of the operations which have just been described a silica slurry is obtained, which in next separated off (liquid-solid separation).

In an alternative form, according to another embodiment of the invention, the precipitation (A) is carried out in the following manner:

(i) an initial base stock is formed comprising at least a proportion of the total quantity of the alkali metal (M) silicate introduced into the reaction and an electrolyte, the silicate concentration expressed in $SiO_2$ in the said initial vessel stock being lower than 100 g/l and the electrolyte concentration in the said initial base stock being lower than 17 g/l;

(ii) the acidifying agent is added to the said base stock until a pH value of the reaction mixture of at least approximately 7 is obtained;

(iii) acidifying agent is added to the reaction mixture and, simultaneously, if appropriate, the remaining quantity of the silicate.

It has thus been found that a low silicate and electrolyte concentration in the initial base stock constitute important conditions for endowing the products obtained with their outstanding properties.

In this embodiment the operation is preferably carried out as follows:

a base stock which includes silicate as well as an electrolyte is formed first of all. The quantity of silicate present in the base stock may be either equal to the total quantity introduced into the reaction or may represent only a proportion of this total quantity.

The electrolyte employed is in particular a salt from the group of the alkali and alkaline-earth metal salts and preferably the salt of the metal of the initial silicate and of the acidifying agent, for example sodium sulphate in the case of the reaction of a sodium silicate with sulphuric acid.

According to an essential characteristic of the process of preparation according to the invention the electrolyte concentration in the initial base stock is lower than 17 g/l, preferably lower than 14 g/l.

According to another essential characteristic of the said process the silicate concentration, expressed as $SiO_2$, in the initial base stock is lower than 100 g of $SiO_2$ per liter. This concentration is preferably lower than 80 g/l, especially lower than 70 g/l. In particular, when the acid employed for the neutralization has a high concentration, especially higher than 70%, is in then appropriate to work with an initial base stock of silicate in which the $SiO_2$ concentration is lower than 80 g/l.

The second stage consists in adding the acidifying agent into the base stock of composition described above.

This addition, which produces a corresponding lowering of the pH of the reaction mixture, is made until a value of at least approximately 7, generally between 7 and 8, is reached.

Once this value has been reached, and in the case of an initial base stock including only a proportion of the total quantity of the silicate introduced, a simultaneous addition of acidifying agent and of the remaining quantity of silicate is then advantageously carried out.

The actual precipitation reaction in finished when all the remaining quantity of silicate has been added.

At the end of the precipitation and especially after the abovementioned simultaneous addition it is advantageous to perform a maturing of the reaction mixture, it being possible for this maturing to last, for example, from 5 minutes to 1 hour.

In all cases (that is to say as well in the case of an initial base stock including only a proportion of the total quantity of the silicate introduced) it to also possible, after the precipitation, in an optional subsequent stage, to add to the reaction mixture an additional quantity of acidifying agent. This addition is generally made until a pH value of between 3 and 6.5, preferably between 4 and 6.5, is obtained.

The temperature of the reaction mixture is generally between 70 and 98° C.

According to an alternative form of the invention the reaction is performed at a constant temperature of between 80 and 95° C. According to another alternative form of the invention the temperature at the end of reaction is higher than the temperature at the beginning of reaction: thus, the temperature at the beginning of the reaction is preferably maintained between 70 and 95° C. and then the temperature is increased over a few minutes, preferably up to a value of between 80 and 98° C., at which it is maintained until the end of the reaction.

At the end of the operations which have just been described a silica slurry is obtained.

Stage (B) of the process consists in the separation of a precipitation cake from this slurry obtained according to one or other of the operating methods. The separation is performed by any known means and especially by filtration with a belt filter, a filter press, a rotary vacuum filter or by centrifuging. A silica cake is then collected in which the solids content is between 10 and 40%.

The separated cake may be washed with water to remove the alkali metal salts formed during the precipitation reaction. For example, in the case where the precipitation involves sodium silicate and sulphuric acid, a cake which has an $Na_2SO_4$ content lower than 1.5% by weight may be isolated at the end of stage (B).

The cakes obtained by press filtration have fairly high solids contents, for example of between 17 and 30%. However, it is also possible to obtain, especially by vacuum filtration, cakes whose solids content is slightly lower, for example between 10 and 15%.

After the separation of the precipitation cake, thickening of the cake may be performed in order to increase its solids content to the desired value of between 10 and 40%.

The thickening consists in adding silica powder in sufficient quantity to the said cake.

In particular, the silica powder may be obtained by drying, especially spray-drying, of a proportion of the cake to be enriched.

It is also possible to obtain a silica powder by performing a conventional drying of the cake after washing with organic solvents. Such a drying process will be described in detail below.

The thickening makes it possible in particular to enrich in silica the cakes which have a relatively low solids content after the filtration (for example lower than 15%), so as to obtain at the end of stage (C) a suspension which is concentrated enough for the intended application.

Stage (C) is then applied to a precipitation cake which has a solids content of between 10 and 40%, obtained, according to the circumstances, after an optional thickening.

The conversion of the cake into less viscous suspension can be carried out by mechanical crumbling. The Crumbling may take place in a crumbler/blender, for example during an operation of dilution of the cake with water, or may be carried out by wet grinding by passing the cake through a grinder of the colloid mill or ball mill type, or by subjecting the cake to ultrasonic waves (ultrasonification). The deagglomeration will preferably be performed under ultrasound by means of a high-power ultrasound probe.

In order to reduce the mechanical energy needed for plasticizing the cakes, it in possible to perform a chemical crumbling at the same time.

For this purpose, advantageously, it is possible to acidify the silica suspension so that its pH is lower than 4. Any acid can be employed for this purpose.

Another advantageous possibility consists in simultaneously introducing into the suspension an acid, especially sulphuric acid, and an aluminium compound, especially sodium aluminate, so that the pH of the suspension remains between 6 and 7 and the $Al/SiO_2$ weight ratio is between 1000 and 3300 ppm.

In an alternative form of the process, in order to increase the solids content of the silica suspension, at the end of the chemical crumbling stage, it is possible:

to perform a second filtration (or centrifuging) stage optionally followed by a wash.

to expel a proportion of the water (for example by evaporation by heating the suspension).

In both these cases it will be possible, at the end of the stage of concentration of the suspension, to carry out a final rehomogenization of the suspension by mechanical crumbling.

In another alternative form of this process it is possible to add the sulphuric acid and the sodium aluminate to the slurry obtained from the precipitation, that is to say after stage (A) (iii) and before the filtration operations (B).

The present invention also proposes another process for conversion (C) of the cake into suspension, whereby:

(i) the said cake is washed with organic solvents and the washed cake is dried to obtain a silica powder and then (ii) a quantity of the said silica powder is suspended in water, such that the solids content of the final suspension is between 10 and 40%.

The suspensions obtained by this process also exhibit the same properties of low viscosity and high stability with a high solids content.

Washing with organic solvents allows the water present in the pores of the cake to be displaced. The solvents employed for this purpose are preferably polar solvents and in particular ethanol and ether, which can be employed as a mixture.

In particular, it is possible to carry out:

a first washing with ethanol a second washing with a 50/50 ethanol/ether mixture a third washing with ether.

Thus washed, the cake may be dried, for example in the open air. A free water content of approximately 6–8% is obtained, which is quite comparable with that obtained with spray-drying.

The present type of drying makes it possible to prevent the collapse of porosity, due to the action of the capillarity forces during the drying.

A powder is thus obtained which is very slightly agglomerated, with a porosity (measured by mercury porosimetry) which is greatly superior to that obtained by spray-drying techniques.

When resuspended in water in quantity such that the solids content of the suspension is between 10 and 40%, this powder produces suspensions which are less viscous than those obtained by resuspending a powder obtained conventionally by spray-drying, and whose viscosity characteristics and particle size are identical with those described above.

The concentrated silica suspensions according to the invention, exhibiting improved rheological and particle size characteristics, can be employed in all applications of silica sols in which the transparency or translucency properties are not necessary.

In this respect, another subject of the invention is the use of the said suspensions as a substitute for silica so is in diverse applications such as:

anticorrosion coatings, concrete, the silica suspensions being capable especially of accelerating the setting of concretes and/or of improving the mechanical properties;

paper, in which the suspensions can be employed as filler or else as retaining agent for fine fillers and fibres;

inorganic adhesives for paper, cardboard and the building industry.

The present invention in illustrated by the following examples.

In the examples which follow the particle size characteristics of the silica suspensions are determined by virtue of a particle size measurement performed on the suspensions with the aid of a CILAS particle size analyser.

The operating method is as follows:

The suspension is diluted by adding deionized water until an aqueous suspension containing 4% of silica is obtained, which is homogenized for 2 minutes by magnetic stirring.

A known volume (expressed in ml) of the homogenized suspension is introduced into the cell of the particle size analyzer and the particle size measurement is carried out, enabling $D_{50}$ to be determined.

The ratio (10× volume of suspension introduced in ml)/ (optical density of the suspension detected by the particle size analyser) is calculated, indicating the content of fin s.

In principle, a volume of suspension is introduced such as to make it possible to obtain an optical density close to 20.

Particle size characteristics of silica powder are also determined in the examples. The operating method is as follows:

2 grams of silica obtained by spray-drying the suspension are weighed into a tablet bottle (h=6 cm and diameter=4 cm) and are made up to 50 grams by adding deionized water. An aqueous suspension containing 4% of silica is thus produced, which is homogenized for 2 minutes by magnetic stirring. The suspension is then deagglomerated using ultrasound.

The suitability of the silica for macro-deagglomeration (break-up of objects from 0.1 to a few tens of microns) is thus measured. The median diameter $D_{50}$ in deterred in the same way, as is the above ratio, which is then the ultrasonic deagglomeration factor $F_P$.

The ultrasonic deagglomeration is carried out with the aid of a VIBRACELL BIOBLOCK (600 W) sonic transducer equipped with a 19-mm diameter probe, as follows:

with the probe immersed over a length of 4 cm, the output power is adjusted so as to obtain a displacement of the power dial needle indicating 20% (which corresponds to an energy dissipated by the probe tip of 120 watts/ $cm^2$). The deagglomeration is performed for 420 seconds.

The particle size measurement is performed as above, but with a SYMPATEC laser scattering particle size analyser.

EXAMPLE 1

The following precipitation reaction is performed:

Ten liters of a sodium silicate solution at a concentration of 5 g/l ($SiO_2/Na_2O$ molar ratio=3.4) are added to a 30-liter reactor equipped with a mixel propeller (rate of rotation=350 rev/min) and with a temperature control system.

The sodium silicate solution is heated to a temperature controlled at 85° C. A solution of sulphuric acid at a concentration of 80 g/l in then introduced over 3 minutes and 19 seconds with stirring, at a flow rate of 0.077 l/min: the neutralization ratio of the base stock in then 85%.

A simultaneous addition of acid and of sodium silicate is then performed over 70 min at the respective flow rates and concentrations of 0.077 l/min and 80 g/l in the case of the acid and 0.107 l/min and 130 g/l in the case of the silicate. The momentary neutralization ratio is 87% and the consolidation ratio (mass of silica added during the simultaneous addition/mass of silica present in the base stock) in 19.5%.

The addition of silicate is then stopped and the addition of acid is continued for 10 min so as to reach a final pH of 4.

The slurry is then filtered an a vacuum filter, washed with 10 liters of water so as to obtain a cake conductivity (measured at 5% solids content) lover than 1000 $\mu s$. The cake obtained, C1, has a solids content of 13% (dry extract).

A fraction of the cake is spray-dried. The silica S1 thus obtained has the following characteristics:

specific surface area measured by the BET method: 230 $m^2/g$;

partial size characteristics after application of ultrasound (SYMPATEC particle size analyser):

$D_{50}$=0.8 $\mu m$ $F_D$=20

A silica-enriched cake is next prepared by thickening the cake C1 with the silica S1.

175 grams of silica S1 are added to 2 kg of the cake C1 (13% solids content), homogenized with the aid of an Ultra Turrax IKA T50 apparatus, so as to obtain a cake which has a solids content of 20%.

The deagglomeration of the cake is performed by employing a VIBRACELL BIOBLOCK (600 W) sonic transducer equipped with a 19-mm diameter probe.

250 ml of cake are introduced into a 400-ml beaker and the deagglomeration is then carried out as follows:

with the probe immersed over a length of 4 cm, the output power is adjusted so as to obtain a displacement of the power dial needle indicating 40% (which corresponds to an energy dissipated by the probe tip of 240 watts/cm$^2$). The deagglomeration is performed for 4 minutes.

At the and of the deagglomeration a suspension is obtained, characterized by a solids content of 20% (dry extract)

a viscosity at a low shear rate (50 s$^{-1}$) lower than 2×10$^{-2}$ Pa.s particle size characteristics (CILAS particle size analyser) $D_{50}$=1 μm $F_D$=30

After about ten days an increase in the viscosity of the sol from 2×10$^{-2}$ to 2×10$^{-1}$ Pa.s is observed. This phenomenon is reversible and the application of ultrasound for 4 min to the suspension of 2×10$^{-1}$ Pa.s in fact allows a viscosity of 2×10$^{-2}$ Pa.s to be obtained again. The suspension is subjected to the settling test under centrifuging.

40 grams of suspension are centrifuged at 7500 revolutions/minute for 30 minutes counting from when the speed of rotation is reached (bringing the centrifuge to a steady condition takes approximately 10 minutes).

The supernatant from centrifuging is then collected and is dried at 160° C. for approximately 2 hours (until a constant weight of material is obtained).

The solids content of the supernatant is 6.16 g, which represents 77% of the weight of silica present in the 40 g of suspension containing 20% of silica.

COMPARATIVE EXAMPLE 1

Into a CELLIER crumbler blender are introduced 4 kg of a cake prepared from a silica marketed by Rhône-Poulenc Chimie under the trademark Zeosil 175 MP, obtained by press filtration, characterized by a solids content of 22% and a sodium sulphate content of 1%. This cake in heated to 60° C. and 12.6 ml of a sodium aluminate solution (containing 22% of alumina and 18% of sodium oxide) and 7.15 ml of sulphuric acid at a concentration of 80 g/l are introduced simultaneously during the deflocculation, so as to maintain this pH at 6.5.

The Al/SiO$_2$ ratio is approximately 2500 ppm.

Maturing is allowed to take place for 20 minutes while the mechanical deflocculation is continued.

The suspension obtained is characterized by:

a viscosity of 6×10$^{-2}$ Pa.s at a shear rate of 50 s$^{-1}$, $D_{50}$ (measured after application of ultrasound) of 10 μm.

A separation of the suspension is observed after approximately one week.

The settling test under centrifuging makes it possible to determine that the supernatant contains a quantity of silica amounting to 6% of the weight of the silica present in the suspension.

EXAMPLE 2

The following precipitation reaction in performed:

Ten liters of a sodium silicate solution at a concentration of 5 g/l (SiO$_2$/Na$_2$O molar ratio=3.4) are added to a 30-liter reactor equipped with a mixel propeller (rate of rotation=350 rev/min) and with a temperature control system.

The sodium silicate solution is heated to a temperature controlled at 85° C. A solution of sulphuric acid at a concentration of 80 g/l is then introduced Over 3 minutes and 29 seconds with stirring, at a flow rate of 0.073 l/min: the neutralization ratio of the base stock is then 85%.

A simultaneous addition of acid and of sodium silicate is then performed over 70 min at the respective flow rates and concentrations of 0.073 l/min and 80 g/l in the case of the acid and 0.107 l/min and 130 g/l in the case of the silicate. The momentary neutralization ratio is 87% and the consolidation ratio (mass of silica added during the simultaneous addition)/(mass of silica present in the base stock) in 19.5%.

The addition of silicate is then stopped and the addition of acid is continued so as to reach a final pH of 4.

The slurry is then filtered on a vacuum filter and washed so as to bring the sodium sulphate content to a value lower than 1%. The cake obtained, C2, has a solids content of 13%.

5 kg of this cake C2 are homogenized by mechanical crumbling in a Cellier crumbler blender and then are heated to a temperature of 60° C. in a stirred trough.

9.2 ml of sodium aluminate solution at a concentration of 22% as Al$_2$O$_3$ and 18.3% as Na$_2$O (d=1.505) and 5.2 ml of a solution of sulphuric acid at a concentration of 80 g/l (d=1.050) are then added simultaneously so as to control the pH at a value of 6.3.

The Al/SiO$_2$ ratio is approximately 2500 ppm.

A maturing of 20 minutes is performed with stirring and the suspension is then subjected to crumbling with ultrasound in 250-ml fractions for 15 min, as in Example 1.

At the end of the crumbling, a second vacuum filtration in performed, which brings the cake to a solids content of 21%.

The cake to nest crumbled mechanically in the CELLIER blender and then using ultrasound under the conditions of Example 1.

The characteristics of the suspension obtained are the following, and are stable in time:

solids content 21% viscosity at a shear rate of 50 s$^{-1}$; 1.3×10$^{-2}$ Pa.s quantity of silica r covered in the supernatant (settling test under centrifuging): 77%.

EXAMPLE 3

A silica suspension is prepared in conditions similar to those of Example 2, with the following modifications in the procedure:

The preparation of the base stock is carried out in an identical manner by introducing sulphuric acid at a flow rate of 0.078 l/min to obtain a neutralization ratio of 90%, The flow of sulphuric acid is also 0.078 l/min during the simultaneous addition of silicate and of acid, which lasts 60 minutes, so that the instantaneous neutralization ratio is 93% and the consolidation ratio is 16.6%.

A cake C3 is separated by vacuum filtration, in which the solids content is 13% and the sodium sulphate content in lower than 1%.

5 kg of this cake C3 are homogenized by mechanical crumbling in a CELLIER crumbler blender and are then heated to a temperature of 60° C. in a stirred trough.

11 ml of sodium aluminate solution at a concentration of 22% as Al$_2$O$_3$ and 18.3% as Na$_2$O (d=1.505) and 6.2 ml of a solution of sulphuric acid at a concentration of 80 g/l (d=1.050) are then added simultaneously so as to control the pH at a value of 6.3.

The $Al/SiO_2$ ratio is approximately 3000 ppm.

A maturing for 20 minutes is performed with stirring and the suspension is then subjected to crumbling using ultrasound in 250-ml fractions for 15 min, as in Example 1.

At the end of the crumbling, a second vacuum filtration is performed, which brings the cake to a solids content of 17.9%.

The cake in next crumbled mechanically in the CELLIER blender and then using ultrasound in the conditions of Example 1.

The characteristics of the suspension obtained are the following, and are stable in time:

solids content: 17.9% viscosity at a shear rate of 50 $s^{-1}$; $0.6 \times 10^{-2}$ Pa.s quantity of silica recovered in the supernatant (settling test under centrifuging): 98%.

A silica suspension is prepared in conditions which are similar to those of Example 3, with the following differences:

The preparation of the base stock is carried out in an identical manner by introducing the sulphuric acid at a flow rate of 0.076 l/min for 3 minutes and 30 seconds to obtain a neutralization ratio of 89%.

The flow rate of sulphuric acid is also 0.076 g/min during the simultaneous addition of silicate and of acid, which lasts 60 minutes, so that the momentary neutralization ratio is 91% and the consolidation ratio is 16.6%.

A cake C4 in separated by vacuum filtration, in which the solids content is 13% and the sodium sulphate content is lower than 1%.

5 kg of this cake C4 are homogenized by mechanical calling in a CELLIER crumbler blender and are then heated to a temperature of 60° C. in a stirred trough.

11 ml of sodium aluminate solution at a concentration of 22% as $Al_2O_3$ and 18.3% as $Na_2O$ (d=1.505) and 6.2 ml of a solution of sulphuric acid at a concentration of 80 g/l (d=1.050) are then added simultaneously so as to control the pH at a value of 6.3.

The $Al/SiO_2$ ratio is approximately 3000 ppm.

A maturing for 20 minutes is performed with stirring and the suspension is then subjected to crumbling using ultrasound in 250-ml fractions for 15 min, an in Example 1.

At the end of the crumbling, a second vacuum filtration is performed, which brings the cake to a solids content of 21.7%.

The cake is next crumbled mechanically in the CELLIER blender and then using ultrasound in the conditions of Example 1.

The characteristics of the suspension obtained are the following solids content: 21.7% viscosity at a shear rate of 50 $s^{-1}$: $1.8 \times 10^{-2}$ Pa.s quantity of silica recovered in the supernatant (settling test under centrifuging): 94%.

What is claimed is:

1. A method for the preparation of an aqueous suspension of precipitated silica, having a solids content between 10 and 40% by weight, a viscosity lower than $4 \times 10^{-2}$ Pa.s at a shear rate of 50 $s^{-1}$ and wherein the amount of silica present in the supernatant obtained after centrifuging said suspension at 7500 revolutions per minute for 30 minutes represents more than 50% of the weight of the silica present in the suspension, consisting of the steps of:

(A) precipitating silica by reacting an acidifying agent with an alkali metal (M) silicate, by:
 (i) providing an initial base stock of a proportion of the total amount of the alkali metal silicate introduced into the reaction, the silicate concentration expressed as $SiO_2$ in said base stock being lower than 20 g/l,
 (ii) adding said acidifying agent to said initial base stock until at least 5% of the amount of $M_2O$ present in said initial base stock is neutralized,
 (iii) adding said acidifying agent to the reaction mixture simultaneously with the remaining amount of alkali metal silicate such that the ratio (amount of silica added)/(amount of silica present in the initial base stock) is between 10 and 100;

(B) separating from the reaction mixture a precipitation cake which has a solids content of between 10 and 40%, and, optionally, adding to said precipitation cake, an amount of silica powder such that the solids content of the silica-enriched cake is between 10 and 40%; and (C) deagglomerating said cake to obtain a suspension of low viscosity and wherein said deagglomerating is conducted under conditions that result in a silica suspension which has a stability such that the amount of silica in the supernatant obtained after centrifuging said suspension at 7500 revolutions per minute for 30 minutes represents more than 50% of the weight of the silica initially present in the suspension.

2. A method according to claim 1, wherein, after step (B), an amount of silica powder is added to said precipitation cake, such that the solids content of the silica-enriched cake is between 10 and 40%.

3. A method according to claim 1, wherein, in step (C), the dilution of said precipitation cake is performed with water.

4. A method according to claim 1, wherein, in step (C), mechanical crumbling of said precipitation cake is performed by a wet grinding process or by an ultrasonic treatment.

5. A method according to claim 1, wherein, in step (C), a chemical crumbling is performed simultaneously with a mechanical crumbling, said chemical crumbling being carried out by acidifying the silica suspension to a pH lower than 4.

6. A method according to claim 1, wherein, in step (C), a chemical crumbling is performed conjointly with a mechanical crumbling, said chemical crumbling being carried out by introducing sulphuric acid and sodium aluminate simultaneously so that the pH of the suspension remains between 6 and 7 and the $Al/SiO_2$ weight ratio is between 1000 and 3300 ppm.

7. A method according to claim 1, wherein, in step A (iii), sulphuric acid and sodium aluminate are simultaneously added to the reaction mixture, so that the pH of the mixture remains between 6 and 7 and the $Al/SiO_2$ weight ratio is between 1000 and 3300 ppm, before proceeding to step (B).

8. A method according to claim 1, wherein, in step (C),
 (i) said precipitation cake is washed with one or more organic solvents and the cake thus washed is dried to obtain a silica powder, and
 (ii) an amount of the said silica powder is suspended in water, such that the silica content of the final suspension is between 10 and 40%.

9. A method for the preparation of an aqueous suspension of precipitated silica, having solids content of between 10 and 40% by weight, which viscosity is lower than $4 \times 10^{-2}$ Pa.s at a shear rate of 50 $s^{-1}$ and wherein the amount of silica present in the supernatant obtained after centrifuging the said suspension at 7500 revolutions per minute for 30 minutes represents more than 50% of the weight of the silica present in the suspension, consisting of the steps of:
  (A) precipitating silica by reacting an acidifying agent with an alkali metal (M) silicate, by:
    (i) providing an initial base stock of at least a proportion of the total amount of the alkali metal silicate to be introduced into the reaction, and an electrolyte, the silicate concentration, expressed as $SiO_2$ in the said initial base stock being lower than 100 g/l and the electrolyte concentration in the said initial base stock being lower than 17 g/l;
    (ii) adding the acidifying agent to said base stock until a pH value of the reaction mixture of at least approximately 7 is obtained;
    (iii) when only a proportion of the silicate is provided by the initial base stock, adding simultaneously the acidifying and the remaining amount of the silicate to the reaction mixture;
  (B) separating from the reaction mixture a precipitation cake which has a solids content of between 10 and 40%, and, optionally, adding to said precipitation cake, an amount of silica powder such that the solids content of the silica-enriched cake is between 10 and 40%; and
  (C) deagglomerating said cake to obtain a suspension of agglomerates having a median diameter $D_{50}$ smaller than 5 μm, whereby a suspension of low viscosity is provided and wherein said deagglomerating is conducted under conditions that result in a silica suspension which possesses a stability such that the amount of silica in the supernatant obtained after centrifuging said suspension at 7500 revolutions per minute for 30 minutes represents more than 50% of the weight of the silica initially present in the suspension.

10. A method according to claim 9, wherein, after step (B), an amount of silica powder is added to said precipitation cake, such that the solids content of the silica-enriched cake is between 10 and 40%.

11. A method according to claim 9, wherein, in step (C), the dilution of said precipitation cake is performed with water.

12. A method according to claim 9, wherein, in step (C), mechanical crumbling of said precipitation cake is performed by a wet grinding process or by an ultrasonic treatment.

13. A method according to claim 9, wherein, in step (C), a chemical crumbling is performed simultaneously with a mechanical crumbling, said chemical crumbling being carried out by acidifying the silica suspension to a pH lower than 4.

14. A method according to claim 9, wherein, in step (C), a chemical crumbling is performed conjointly with a mechanical crumbling, said chemical crumbling being carried out by introducing sulphuric acid and sodium aluminate simultaneously so that the pH of the suspension remains between 6 and 7 and the $Al/SiO_2$ weight ratio is between 1000 and 3300 ppm.

15. A method for the preparation of an aqueous suspension of precipitated silica, having solids content of between 10 and 40% by weight, which viscosity is lower than $4\times10^{-2}$ Pa.s at a shear rate of 50 s$^{-1}$ and wherein the amount of silica present in the supernatant obtained after centrifuging the said suspension at 7500 revolutions per minute for 30 minutes represents more than 50% of the weight of the silica present in the suspension, consisting of the steps of:
  (A) precipitating silica by reacting an acidifying agent with an alkali metal (M) silicate, by:
    (i) providing an initial base stock of at least a proportion of the total amount of the alkali metal silicate to be introduced into the reaction, and an electrolyte, the silicate concentration, expressed as $SiO_2$ in the said initial base stock being lower than 100 g/l and the electrolyte concentration in the said initial base stock being lower than 17 g/l;
    (ii) adding the acidifying agent to said base stock until a pH value of the reaction mixture of at least approximately 7 is obtained;
    (iii) when only a proportion of the silicate is provided by the initial base stock, adding simultaneously the acidifying and the remaining amount of the silicate to the reaction mixture, wherein sulphuric acid and sodium aluminate are simultaneously added to the reaction mixture, so that the pH of the mixture remains between 6 and 7 and the $Al/SiO_2$ weight ratio is between 1000 and 3300 ppm, before proceeding to step (B);
  (B) separating from the reaction mixture a precipitation cake which has a solids content of between 10 and 40%, and, optionally, adding to said precipitation cake, an amount of silica powder such that the solids content of the silica-enriched cake is between 10 and 40%; and
  (C) deagglomerating said cake to obtain a suspension of agglomerates having a median diameter $D_{50}$ smaller than 5 μm, whereby a suspension of low viscosity is provided and wherein said deagglomerating is conducted under conditions that result in a silica suspension which possesses a stability such that the amount of silica in the supernatant obtained after centrifuging said suspension at 7500 revolutions per minute for 30 minutes represents more than 50% of the weight of the silica initially present in the suspension.

16. A method according to claim 9, wherein, in step (C),
  (i) the said precipitation cake is washed with one or more organic solvents and the cake thus washed is dried to obtain a silica powder, and
  (ii) an amount of the said silica powder is suspended in water, such that the solids content of the final suspension is between 10 and 40%.

17. A method for the preparation of an aqueous suspension of precipitated silica, having a solids content between 10 and 40% by weight, a viscosity lower than $4\times10^{-2}$ Pa.s at a shear rate of 50 s$^{-1}$ and wherein the amount of silica present in the supernatant obtained after centrifuging said suspension at 7500 revolutions per minute for 30 minutes represents more than 50% of the weight of the silica present in the suspension, said preparation method excluding the addition of an electrolyte, comprising the steps of:
  (A) precipitating silica by reacting an acidifying agent with an alkali metal (M) silicate, by:
    (i) providing an initial base stock of a proportion of the total amount of the alkali metal silicate introduced into the reaction, the silicate concentration expressed as $SiO_2$ in said base stock being lower than 20 g/l,
    (ii) adding said acidifying agent to said initial base stock until at least 5% of the amount of $M_2O$ present in said initial base stock is neutralized,
    (iii) adding said acidifying agent to the reaction mixture simultaneously with the remaining amount of alkali metal silicate such that the ratio (amount of silica added)/(amount of silica present in the initial base stock) is between 10 and 100, and wherein;
  (B) separating from the reaction mixture a precipitation cake which has a solids content of between 10 and 40%, and, optionally, adding to said precipitation cake, an amount of silica powder such that the solids content of the silica-enriched cake is between 10 and 40%; and (C) deagglomerating the said cake to obtain a suspension of low viscosity and wherein said deagglomerating is conducted under conditions that result in a silica suspension which has a stability such that the amount of silica in the supernatant obtained after centrifuging said suspension at 7500 revolutions per minute for 30 minutes represents more than 50% of the weight of the silica initially present in the suspension.

18. A method for the preparation of an aqueous suspension of precipitated silica, having solids content of between 10 and 40% by weight, which viscosity is lower than $4\times10^{-2}$ Pa.s at a shear rate of 50 s$^{-1}$ and wherein the amount of silica present in the supernatant obtained after centrifuging the said suspension at 7500 revolutions per minute for 30 minutes represents more than 50% of the weight of the silica present in the suspension, said preparation method excluding the addition of an electrolyte, comprising the steps of:

(A) precipitating silica by reacting an acidifying agent with an alkali metal (M) silicate, by:
  (i) providing an initial base stock of at least a proportion of the total amount of the alkali metal silicate to be introduced into the reaction, the silicate concentration, expressed as SiO$_2$ in the said initial base stock being lower than 100 g/l;
  (ii) adding the acidifying agent to said base stock until a pH value of the reaction mixture of at least approximately 7 is obtained;
  (iii) when only a proportion of the silicate is provided by the initial base stock, adding simultaneously the acidifying and the remaining amount of the silicate to the reaction mixture;

(B) separating from the reaction mixture a precipitation cake which has a solids content of between 10 and 40%, and, optionally, adding to said precipitation cake, an amount of silica powder such that the solids content of the silica-enriched cake is between 10 and 40%.

(C) deagglomerating said cake to obtain a suspension of agglomerates having a median diameter D$_{50}$ smaller than 5 µm, whereby a suspension of low viscosity is provided and wherein said deagglomerating is conducted under conditions that result in a silica suspension which possesses a stability such that the amount of silica in the supernatant obtained after centrifuging said suspension at 7500 revolutions per minute for 30 minutes represents more than 50% of the weight of the silica initially present in the suspension.

* * * * *